M. GALLY.
Draft-Equalizer.
No. 63,238.
Patented Mar. 26, 1867.
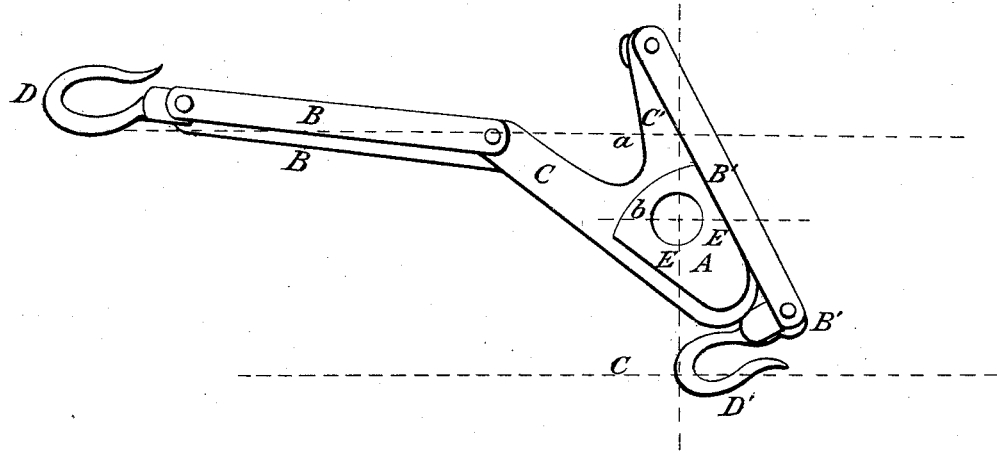
Witnesses:
Inventor:
Merritt Gally.

United States Patent Office.

MERRITT GALLY, OF MARION, NEW YORK.

*Letters Patent No. 63,238, dated March 26, 1867.*

IMPROVEMENT IN "EVENER" FOR WHIFFLE-TREES, &c.

*The Schedule referred to in these Letters Patent and making part of the same.*

TO ALL WHOM IT MAY CONCERN:

Be it known that I, MERRITT GALLY, of Marion, in Wayne county, and State of New York, have invented a new and improved "Evener," for the equalization of draughts in the application of two-horse or other double power; and I do hereby declare that the following is a full and exact description thereof, reference being had to the accompanying drawings and the letters of reference marked thereon.

A represents the body of the evener, perforated for the passage of a bolt.

C C' represent projecting levers, to which are pivoted the iron bars B B and B' B'.

D D' represent hooks pivoted to the extremities of the bars for the application of the draughts.

E E' represent stops for limiting the movement of the bars B B and B' B', thus causing the evener to fold upon itself, and giving alternate projection to the hooks D and D'.

This evener differs intrinsically from the "strap and pulley," and has many superior advantages over it.

It will be seen by the dotted lines *a b c*, that when one hook, D, is carried forward to its limit, the other hook, D', which is thrown back, has an advantage in leverage, while the projected hook D has an advantage in draughts. The advantage of the hook D' is more than enough, in the position represented in the drawing, to compensate for the advantage in projection of the hook D, and therefore allows an easy start; but this surplus advantage is overcome by a disadvantage at a point before the draught of the hooks is equalized when equally projected. Thus is secured not only alternate projection of the hooks, but, what is more important, equalization of draught.

What I claim as my invention, and desire to secure by Letters Patent, is—

The body of the evener A, with stops E E', the projecting levers C C', and pivoted bars B B, B' B', combined and constructed as herein set forth and for the purposes mentioned.

MERRITT GALLY.

Witnesses:
T. K. YOUNG,
NELSON P. YOUNG.